(12) United States Patent
Kuraguchi et al.

(10) Patent No.: US 6,883,542 B2
(45) Date of Patent: Apr. 26, 2005

(54) COMPRESSED AIR RETRIEVAL DEVICE OF COMPRESSOR

(75) Inventors: Kazuhiko Kuraguchi, Tokyo (JP); Hajime Takemura, Tokyo (JP); Masatoshi Asai, Tokyo (JP)

(73) Assignee: Max Co., Ltd., Tokyo (JP)

( * ) Notice: Subject to any disclaimer, the term of this patent is extended or adjusted under 35 U.S.C. 154(b) by 0 days.

(21) Appl. No.: 10/490,146

(22) PCT Filed: Sep. 20, 2002

(86) PCT No.: PCT/JP02/09710
§ 371 (c)(1),
(2), (4) Date: Mar. 19, 2004

(87) PCT Pub. No.: WO03/027502
PCT Pub. Date: Apr. 3, 2003

(65) Prior Publication Data
US 2004/0238047 A1 Dec. 2, 2004

(30) Foreign Application Priority Data
Sep. 20, 2001 (JP) ........................................ 2001-287583
Sep. 20, 2001 (JP) ........................................ 2001-287584

(51) Int. Cl.⁷ ................................................ F17D 1/00
(52) U.S. Cl. .................. 137/613; 251/149.1; 251/149.6
(58) Field of Search ................................. 137/613, 614, 137/614.04; 251/149.1, 149.6

(56) References Cited

U.S. PATENT DOCUMENTS

| | | | | |
|---|---|---|---|---|
| 3,828,821 A | * | 8/1974 | Dotter | 137/613 |
| 4,173,986 A | * | 11/1979 | Martin | 137/613 |
| 4,844,123 A | * | 7/1989 | Wick | 251/149.5 |
| 5,074,524 A | | 12/1991 | Wade | |
| 6,279,874 B1 | | 8/2001 | Nyberg | |

FOREIGN PATENT DOCUMENTS

| | | |
|---|---|---|
| JP | 4-296505 | 10/1992 |
| JP | 2000-249071 | 9/2000 |
| JP | 2002-233973 | 8/2002 |
| JP | 2002-266767 | 9/2002 |

\* cited by examiner

Primary Examiner—Kevin Lee
(74) Attorney, Agent, or Firm—Morgan, Lewis & Bockius LLP (57) ABSTRACT

A socket portion (11) capable of mounting either of a high pressure exclusive plug and a normal pressure exclusive plug is formed at one end of a coupler (6). In the coupler (6), an opening/closing valve (18) for opening and closing a flow path of a compressed air is provided, and a pressure reducing valve for reducing an air pressure to a predetermined pressure value proximate to substantially an upper limit value of an operating pressure region of a normal pressure tool by controlling the opening/closing valve (18) is formed. Thereby, when the normal pressure exclusive plug (P1) is mounted, air the pressure of which is reduced by the pressure reducing valve is supplied to the normal pressure exclusive plug (P1).

3 Claims, 7 Drawing Sheets

COMPRESSED AIR RETRIEVAL DEVICE OF COMPRESSOR

TECHNICAL FIELD

The present invention relates to a compressed air output apparatus in a compressor as a drive source of pneumatic tools for normal pressure using an operating air pressure in a normal pressure region and for high pressure having a higher operating pressure region for supplying compressed air to both of the pneumatic tools or the like.

BACKGROUND ART

There are known pneumatic tools for normal pressure using an operating air pressure in a normal pressure region equal to or lower than, for example, 8 kg/cm2 and for high pressure used in a pressure region at high pressure having a high operating pressure region and according to the tools. In these tools, there are used plugs attached to hoses for supplying compressed air to the tools respectively having exclusive shapes for preventing erroneous connection. Further, according to a compressor capable of supplying compressed air to either of the tools for high pressure and for normal pressure, the compressor needs to be installed with at least respective ones of an air output port exclusive for high pressure and an air output port exclusive for normal pressure, and the respective compressed air output ports need to be mounted with exclusive couplers and pressure regulators for connecting plugs exclusive for high pressure and normal pressure. This constitutes a factor of increasing cost of the compressor.

Hence, as a related art, the applicant has already proposed a compressed air output apparatus installed with a coupler connectable to both of a plug exclusive for high pressure on a side of a high pressure tool and a plug exclusive for normal pressure, in which in the case the coupler is connected with the plug for normal pressure, when a supplied pressure regulated by a pressure regular exceeds an operating pressure region of a normal pressure tool, supply of compressed air to a side of the normal pressure plug is cut off. By this constitution, a single compressor output port may be installed in using either of the tools for normal pressure and high pressure and therefore, the cost of the compressor can be reduced.

Figure 15:
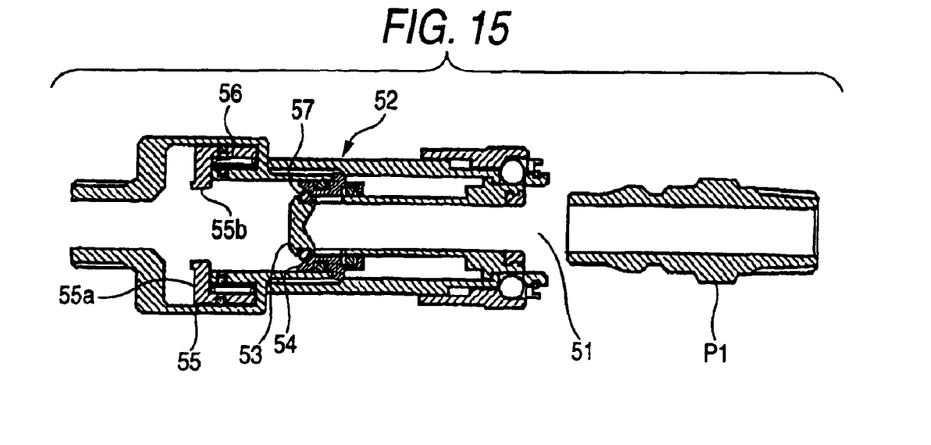
FIG. 15 is a sectional view showing a constitution of a coupler of a related art capable of mounting either of plugs exclusive for normal pressure and exclusive for high pressure respectively having different shapes.

As shown by FIG. 15, according to the constitution of the coupler in the compressed air output apparatus which has already been proposed as the related art, the coupler is formed with a socket portion 51 connectable to either of the respective exclusive plugs for high pressure and for normal pressure at one end thereof and is formed with a cutoff valve 52 for preventing compressed air supplied from other end side from leaking in a state in which the socket portion 51 is not connected with the plug. Compressed air is communicated with a side of the plug by separating a movable valve body 53 constituting the cutoff valve 52 from a valve seat 54 by mounting the plug.

Figure 16:
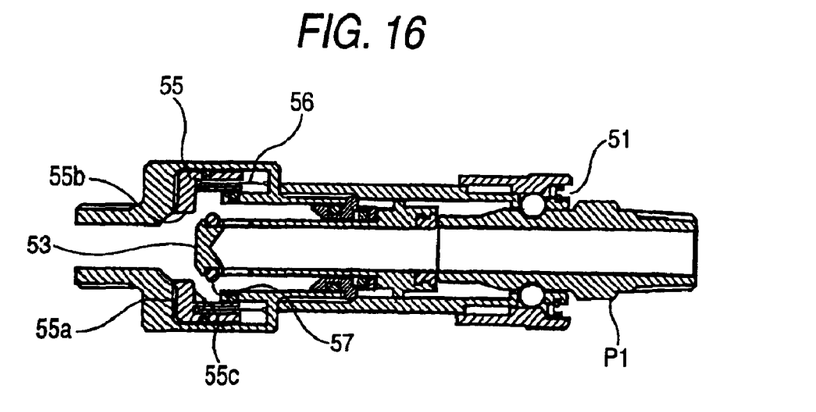
FIG. 16 is a sectional view showing a state in which the normal pressure exclusive plug is mounted to the coupler of the related art and an opening/closing valve is opened.
Figure 17:
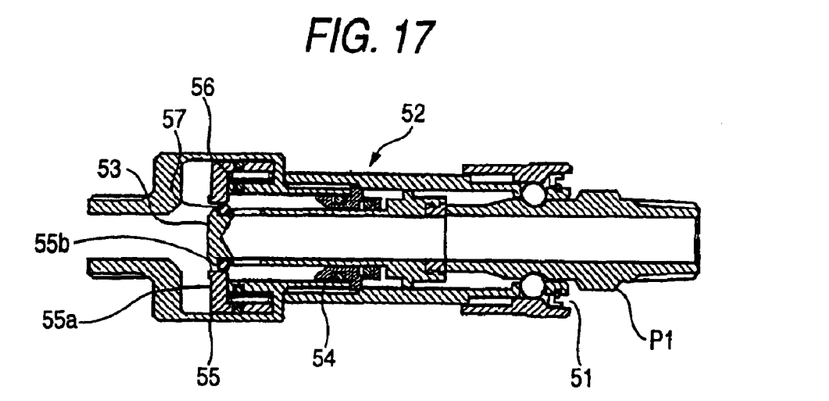
FIG. 17 is a sectional view showing a state in which the normal pressure exclusive plug is mounted to the coupler of the related art and the opening/closing valve is closed.

As shown by FIG. 16 and FIG. 17, there is provided an opening/closing valve 55 for closing supplied air from flowing to the socket portion 51 when a supplied pressure from a pressure regulator becomes high by exceeding the operating pressure region of the normal pressure tool in a state of being connected with a plug P1 for normal pressure. The opening/closing valve 55 is constituted to operate by a pressure receiving face 55a for operating the opening/closing valve 55 in a closing direction by receiving the air pressure supplied from the pressure regulator and a spring 56 for urging the opening/closing valve 55 in an opening direction opposedly to the pressure receiving face 55a, and the opening/closing valve 55 cuts off an air path by fitting an O ring 57 of the movable valve body 53 into a cylindrical portion 55b of the opening/closing valve 55 in cooperation with the movable valve body 53 moved by mounting the normal pressure plug P1. The opening/closing valve 55 is set with a spring force of the spring 56 and an area of the pressure receiving face 55a for receiving compressed air such that the opening/closing valve 55 is operated in a closing direction at an upper limit of the operating air pressure region, and operated when a regulated pressure of the pressure regulator exceeds the above-described set pressure to cut off supply of compressed air to the normal pressure plug P1 to thereby present compressed air at the pressure exceeding the operating air pressure region from being supplied to the tool exclusive for normal pressure.

However, in a state of being connected with the tool exclusive for normal pressure, when the supplied air pressure exceeds the operating air pressure at normal pressure by operating to regulate the pressure regulator for setting the pressure used for the tool, naturally, the opening/closing valve 55 is operated to cut off flow of compressed air, however, in a state of temporarily closing the opening/closing valve 55, the cylindrical portion 55b of the opening/closing valve 55 is fitted to the O ring 57 of the movable valve body and therefore, a sliding resistance is increased, further, the opening/closing valve 55 of the above-described mechanism is constituted to be operated by a difference between the pressure receiving face 56a of a face on an upstream side and a pressure receiving face 56c of a face on a downstream side and the spring force, in a state in which the path is cut off by operating the opening/closing valve 55, the two pressure receiving faces are cut off by the opening/closing valve body, there is a case in which the pressurized receiving face side 55c on the downstream side facing the side of the plug is reduced in pressure to almost 0 kg/cm2, the pressure difference operating to the two pressure receiving faces is increased and therefore, there is brought about a state in which the opening/closing valve 55 is not operated in the direction of opening the air path even when the supplied air pressured is reduced from the above-described set pressure by a small amount by regulating the pressure regulator again. For example, when the opening/closing valve 55 is set to operate in the closing direction by the supplied air pressure of 8 kg/cm2, in the case of the temporarily closed opening/closing valve 55, the opening/closing valve 55 cannot be operated unless the supply pressure of the pressure regulator is reduced down to 5 kg/cm2. Therefore, there poses a problem that when the tool for normal pressure is used, the tool is not user-friendly.

Figure 18:
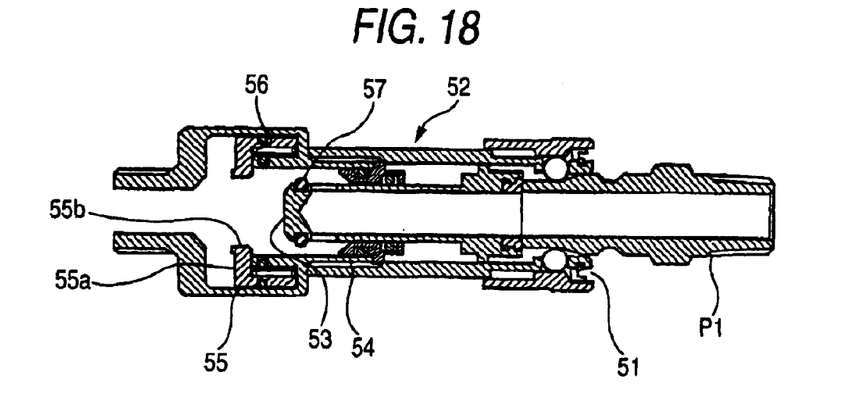
FIG. 18 is a sectional view showing a state of a procedure of mounting the normal pressure exclusive plug to the coupler of the related art.

Further, according to the above-described mechanism, in a state in which neither of the plugs for high pressure and normal pressure is mounted thereto, the movable valve body 53 and the opening/closing valve 55 are brought into a state of being separated from each other and as shown by FIG. 18, in a procedure of mounting the normal pressure plug P1 to the socket portion 51, there is brought about a state in which the cutoff valve 52 is opened and the opening/closing valve 55 is not fitted to the movable valve body 53. Under the state, when the regulated pressure of the pressure regulator is regulated to high pressure and air at high pressure is supplied to the supply port of the coupler, during a time period until compressed air is cut off by cooperating the opening/closing valve 55 and movable main body 53 in a procedure of connecting the normal pressure plug P1, it is brought about that compressed air at high pressure is supplied to the normal pressure plug P1 and compressed air at high pressure is supplied to the tool exclusive for normal pressure. Further, when the regulated pressure of the pressure regulator is changed to high pressure in using the tool exclusive for normal pressure, the opening/closing valve 55 is operated and supply of compressed air at high pressure to the side of the plug is cut off, however, also when the normal pressure plug P1 mounted to the socket portion 51 is detached from the state, similar to the above-described, there is a case in which the opening/closing valve 55 is opened by being separated from the movable valve body 53 before closing the cutoff valve 52 and compressed air at high pressure is supplied to the tool exclusive for normal pressure.

It is a first object of the invention to resolve the above-described problem of the related art and enabling to prevent supply of compressed air exceeding an operating air pressure of a normal pressure tool to the normal pressure tool by cutting a flow path when an output air pressure at a pressure regular exceeds a set pressure in connecting a normal pressure plug and swiftly supplying compressed air at an operating air pressure by regulating again a supply pressure at the pressure regulator to be equal to or lower than the operating air pressure after cutting off the flow path.

Further, when compressed air exceeding an operating pressure region of a normal pressure tool is supplied in connecting or separating a pneumatic tool exclusive for normal pressure, not only service life of the tool is significantly deteriorated but also a danger is accompanied thereby depending cases. It is a second object of the invention to provide a compressed air output apparatus in which the above-described problem of the related art is resolved and high pressure air is not supplied to a tool exclusive for normal pressure via a normal pressure plug even in the midst of operating to attach or detach a normal pressure plug in a state in which compressed air at high pressure is supplied to a coupler.

SUMMARY OF THE INVENTION

A first aspect of the invention is a compressed air output apparatus in a compressor formed with a socket portion mountable with either of a high pressure exclusive plug and a normal pressure exclusive plug at one end of a coupler and including an opening/closing valve for opening and closing a flow path of compressed air supplied to an upstream side of the socket portion via a pressure regulator and formed with a pressure reducing valve for reducing an air pressure supplied from the pressure regulator to a predetermined pressure value proximate to substantially an upper limit value of an operating pressure region of a normal pressure tool by controlling to open and close the opening/closing valve to supply to a side of the socket portion, wherein when the normal pressure exclusive plug is mounted to the socket portion, air the pressure of which is reduced by the pressure reducing valve is connected to the normal pressure exclusive plug and by mounting the high pressure exclusive plug to the socket portion, the opening/closing valve is operated to maintain at an opening position by the high pressure exclusive plug and the air pressure supplied from the pressure regulator is communicated with the high pressure plug.

Further, a second aspect of the invention is a compressor air output apparatus in a compressor formed with a socket portion mountable to a high pressure exclusive plug and a normal pressure exclusive plug at one end of a coupler and including an opening/closing valve urged by a spring for cutting off compressed air by being brought into close contact with a face on an upstream side of a valve seat formed at a coupler housing at inside of the coupler, wherein in connecting the normal pressure exclusive plug, a spring urge force in an opening direction is produced at the opening/closing valve via a cylindrical member operated by a front end of the high pressure exclusive plug, the opening/closing valve is cut off when the supplied pressure exceeds a predetermined pressure by a balance between the air pressure operated at the opening/closing valve by the compressed air supplied from the pressure regulator and the spring urge force, and in connecting the high pressure exclusive plug, the cylindrical member is operated by the front end of the high pressure exclusive plug for operating the opening/closing valve at an opening position to maintain at the opening position.

Further, a third aspect of the invention is a compressed air output apparatus in a compressor including a first cutoff valve for cutting off a flow path of compressed air supplied to an air supply port by being operated by mounting a normal pressure exclusive plug, a second cutoff valve operated by mounting a high pressure exclusive plug for cutting off the flow path of the compressed air supplied to the air supply port and an opening/closing valve operated by the compressed air supplied to the air supply port for opening and closing an air path on an upstream side of the first cutoff valve in a coupler formed with a socket portion mountable with either of the high pressure exclusive plug and the normal pressure exclusive plug, wherein the opening/closing valve is made to close between the air supply port and the first cutoff valve when a pressure of the compressed air supplied to the air supply port exceeds a predetermined pressure and an air path between the second cutoff valve and the air supply port is formed without interposing the opening/closing valve.

DESCRIPTION OF THE PREFERRED EMBODIMENTS

Figure 1:
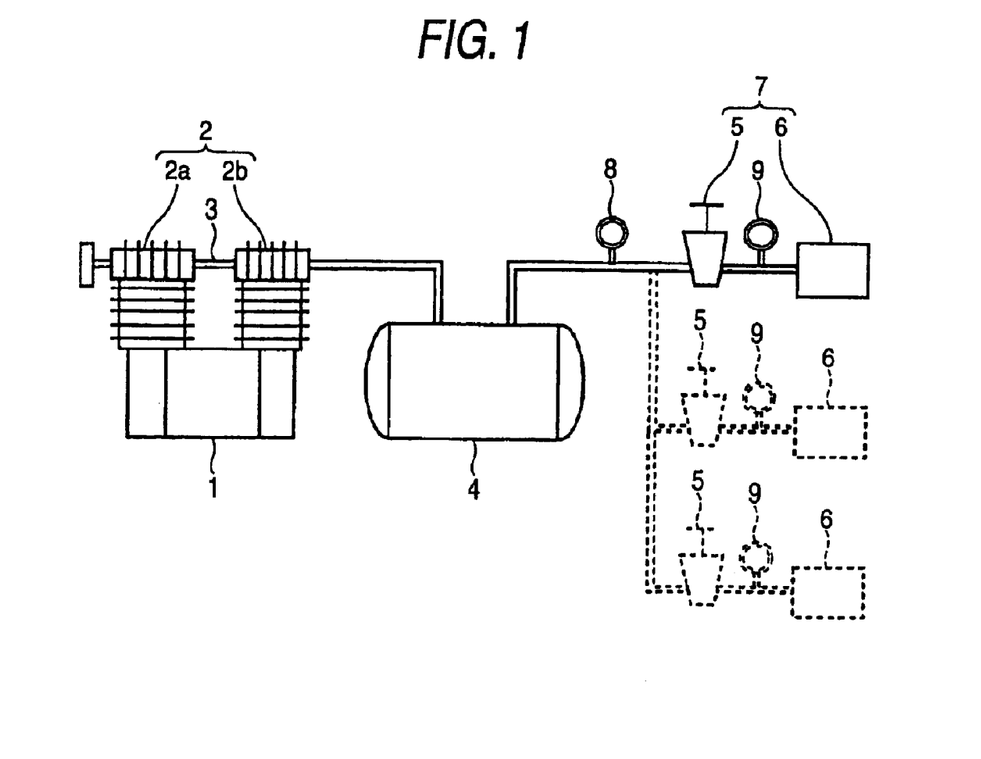
FIG. 1 is a constitution view of a compressor embodying a compressed air output apparatus of the invention.

An explanation will be given of a mode for carrying out the invention based on embodiments shown in the drawings as follows. FIG. 1 is an outline view of an air compressor or embodying a compressed air output apparatus according to the invention, a compressor 2 driven by an electric motor 1 compresses air at an atmospheric pressure to a middle pressure by a prestage compressor 2a and a postage compressor 2b intakes air at the middle pressure via a communicating pipe 3 to compress to a high pressure compatible with an operating air pressure of a pneumatic tool exclusive for high pressure. The high pressure air is stored in an air tank 4. The air tank 4 is installed with at least one of a compressed air output apparatus 7 comprising a pressure regulator 5 for regulating pressure of compressed air supplied to pneumatic tool and a coupler 6 for connecting a plug on a side of the tool. In the drawing, numerals 8 and 9 respectively designate pressure indicators for indicating an air pressure value at inside of the air tank 4 and a regulated pressure value by the pressure regulator 5. The pressure regulator 5 reduces the pressure of compressed air stored at inside of the air tank 4 to an arbitrary regulated pressure from an operating pressure region of a normal pressure tool to a range of an operating pressure region of a high pressure tool to supply to the coupler 6.

(First Embodiment)

Figure 2:
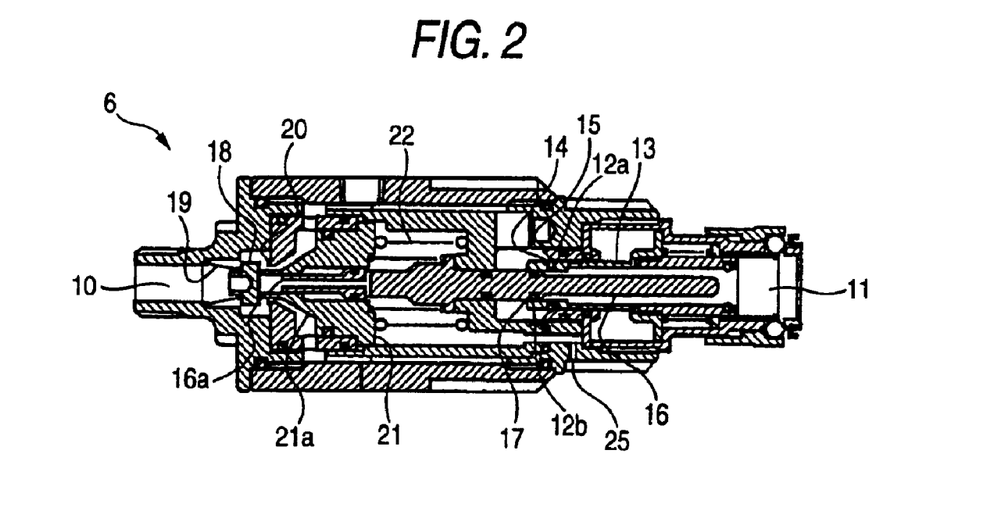
FIG. 2 is a sectional view showing a constitution of a coupler according to a first embodiment of the invention.

An explanation will be given of a first embodiment of the invention in reference to FIG. 2 through FIG. 5. As shown by FIG. 2, a coupler 6 is formed with an air supply port 10 connected to the pressure regulator 5 and supplied with compressed air at reduced pressure on one end side thereof and formed with a socket portion 11 of a female type for receiving and mounting a plug connected with a tool at an end portion on an opposed side. The socket portion 11 is formed to be connectable to either of plugs for normal pressure and for high pressure respectively having different shapes. Inside of the coupler 6 is formed with cutoff valves 12a, 12b for preventing flow of compressed air from a supply side in a state in which the plug is not connected thereto, the cutoff valve 12a is constituted by an O ring 14 mounted to an outer peripheral face of a cylindrical member 13 operated by mounting a normal pressure exclusive plug P1 to the socket portion 11 and a valve seat 15 formed at a plug housing, and in a state in which the normal pressure exclusive plug P1 is connected to the socket portion 11, the cylindrical member 13 is operated and the cutoff valve 12a is opened to thereby communicate compressed air from a side of the air supply port 10 to a side of the socket portion 11. The cutoff valve 12b is constituted by an O ring 17 mounted to an outer periphery of a rod 16 operated by mounting a high pressure exclusive plug P2 and the cylindrical member 13 and the rod 16 is operated by mounting the high pressure exclusive plug P2 to thereby communicate compressed air to a side of the high pressure exclusive plug P2.

Further, a side of the air supply port 10 of the coupler 6 is provided with an opening/closing valve 18 for opening and closing a compressed air path from the air supply port 10 to the side of the socket portion. The opening/closing valve 18 is brought into close contact with a face on an upstream side of a valve seat 20 formed at the plug housing by an urge spring 19 and an air pressure supplied from the air supply port 10 to thereby cut off compressed air. A downstream side of the opening/closing valve 18 is slidably arranged with an operating member 21 operated to open and close the opening and closing valve 18, the operating member 21 is operated by a balance between a compressed air pressure operated to a pressure receiving face 21a for receiving compressed air passing the opening and closing valve 18 and a spring force for pressing the operating member 21 by a spring 22 arranged on a side opposed to the pressure receiving face 21a to thereby operate to open and close the opening and closing valve 18. The press force of the spring 22 and an area of the pressure receiving face 21a are set such that a boundary of the pressure of compressed air operated to the pressure receiving face 21a is constituted by an upper limit pressure of an operating pressure of a normal pressure tool, for example, 8.5 kg/cm2, and when the air pressure operated to the pressure receiving face 21a becomes higher than the boundary, the opening/closing valve 18 is operated in a closing direction and when the air pressure becomes lower than the boundary, the opening/closing valve 18 is operated in an opening direction.

Figure 3:
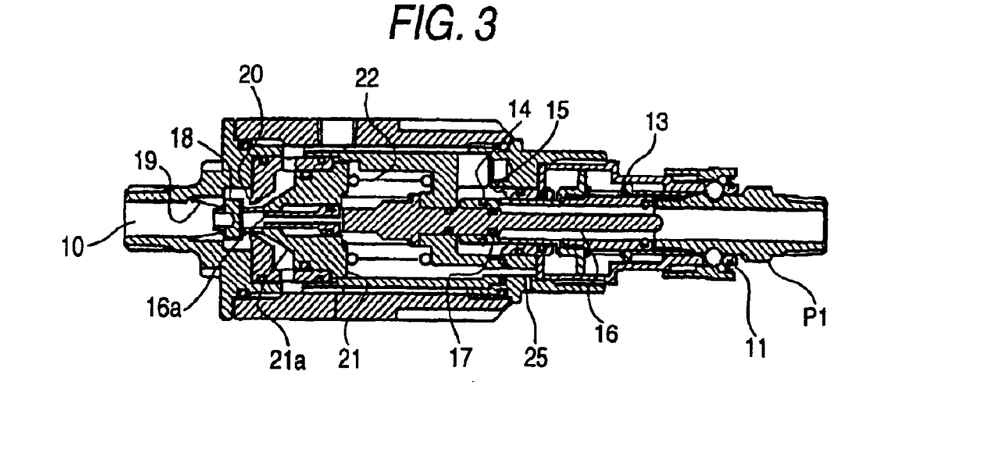
FIG. 3 is a sectional view showing a state in which a normal pressure exclusive plug is mounted to the coupler according to the first embodiment and an opening/closing valve is opened.

That is, the opening/closing valve 18 and the operating member 21 function as a pressure reducing valve set by the spring 22 and the pressure receiving face 21a and when the socket portion is connected with the normal pressure exclusive plug P1 as shown by FIG. 3, the normal pressure exclusive plug P1 is supplied with compressed air pressure of which is reduced to a pressure set by the pressure receiving face 21a and the spring 22. When the normal pressure tool is used at a pressure lower than the above-described set pressure, the air pressure supplied to the air supply port 10 by the pressure regulator 5 is regulated to be lower than the set pressure. Thereby, the operating member 21 is operated in a state of opening the opening/closing valve 18 by the spring force of the spring 22 and the normal pressure tool is supplied with compressed air at the pressure regulated by the pressure regulator 5. A face of the operating member 21 opposed to the pressure receiving face 21a is always communicated with the atmosphere via a path 25. Therefore, the area of the pressure receiving face is not varied in opening and closing the opening/closing valve 18 and the balance is not deteriorated by a direction of operating the operating member 21.

Figure 5:
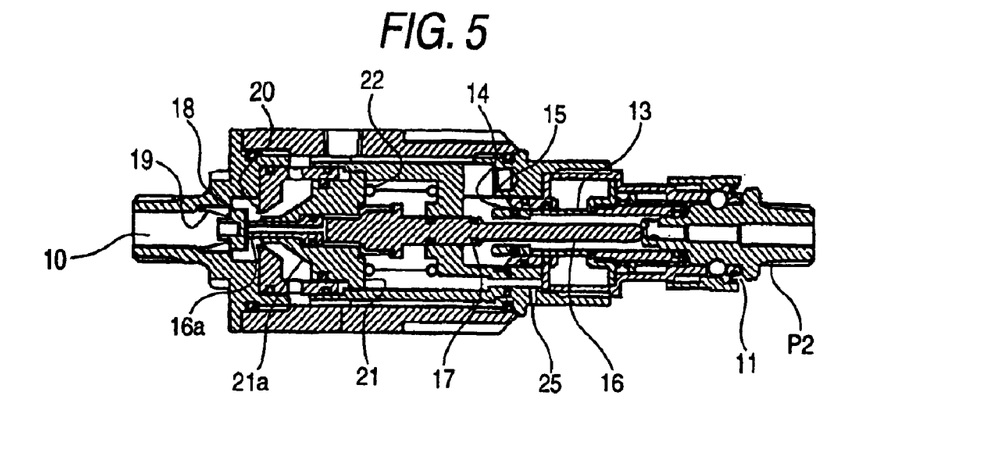
FIG. 5 is a sectional view showing a state of mounting a high pressure exclusive plug to the coupler according to the first embodiment.

As shown by FIG. 5, by mounting the high pressure exclusive plug P2 to the socket portion 11, other end 16a of the rod 16 operated by being brought into contact with a front end of the plug is expended in a direction of the opening/closing valve 18 and by mounting the high pressure exclusive plug P2 to the socket portion 11 and operating the rod 16, the front end 16a of the rod 16 is brought into contact with the opening/closing valve 18 and separates the opening/closing valve 18 from the valve seat 20 to maintain a state of opening the opening/closing valve 18. Thereby, in using the high pressure exclusive tool, the opening state of the opening/closing valve 18 is maintained and the high pressure tool can be supplied with compressed air at a pressure regulated by the pressure regulator 5. Further, even when the pressure is regulated to a pressure equal to or lower than an operating pressure of the high pressure tool, compressed air at a low pressure is supplied to the high pressure tool, however, a danger thereby is not brought about and no problem is posed. The supply pressure may be increased by regulating again the pressure regulator 5.

In a state in which the socket portion 11 is not connected with either of the plugs for normal pressure and for high pressure, when the air supply port 10 is supplied with compressed air in the operating pressure region of the normal pressure tool, although the air pressure is operated to the pressure receiving face 21a of the operating member 21, since the press force of the spring 22 is larger than the air pressure, the operating member 21 presses to open the opening/closing valve 18 and compressed air is communicated with a portion of the cutoff valve 12a. When the normal pressure exclusive plug P1 connected to the normal pressure tool is connected to the socket portion 11 as shown by FIG. 3, the cylindrical member 13 is pressed by the plug to open the cutoff valve 12a and compressed air in the normal pressure region supplied to the air supply port 10 is supplied to the tool as it is via the plug.

Figure 4:
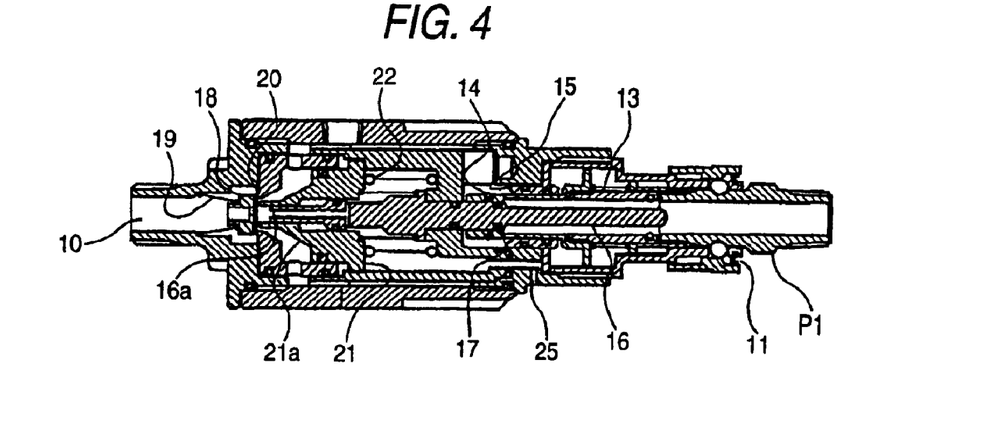
FIG. 4 is a sectional view of a state the same as that of FIG. 3 showing a state of closing the opening/closing valve.

When the regulated pressure of the pressure regulator 5 is regulated from the state to the pressure in the high pressure region, compressed air at high pressure is operated to the pressure receiving face 21a of the operating member 21 to operate the operating member 21, thereby, as shown by FIG. 4, the opening/closing valve 18 is closed and compressed air at high pressure is cut off from flowing to a side of the socket portion 11 in a downstream direction. When the air pressure on the downstream side is lowered by dissipating compressed air on the side of the tool, also the air pressure operating to the pressure receiving face 21a of the operating member 21 is lowered and therefore, as shown by FIG. 3, the operating member 21 is operated and the opening and closing valve 18 is opened. By opening the opening/closing valve 18, the high air pressure is operated to the pressure receiving face 21a of the operating member 21 and the opening/closing valve 18 is closed again by the operating member 21. In this way, the side of the normal pressure tool is supplied with compressed air the pressure of which is reduced by the upper limit pressure of the operating region of the normal pressure tool set by the pressure receiving face 21a and the spring 22 by the function of the pressure reducing valve by the operating member 21 and the opening/closing valve 18. Therefore, the normal pressure tool is not supplied with compressed air at a high pressure exceeding the upper limit pressure.

When the air supply port 10 is supplied with compressed air at the high pressure region in a state in which the plug is not mounted to the socket portion 11, compressed air at high pressure is operated to the pressure receiving face 21a of the operating member 21 and the portion of the cutoff valve 12a is supplied with the upper limit pressure of the operating pressure region of the normal pressure tool set by the pressure receiving face 21a and the spring 22 by the function of the pressure reducing valve by the operating member 21 and the opening/closing valve 18. When the normal pressure exclusive plug P1 is connected to the socket portion 11, compressed air at the above-described upper limit pressure is supplied to the side of the tool, however, compressed air at the pressure exceeding the upper limit pressure is not supplied to the tool exclusive for normal pressure.

(Second Embodiment)

Next, an explanation will be given of a second embodiment of the invention in reference to FIG. 6 through FIG. 9. A coupler 30 connected to the downstream side of the pressure regulator 5 is formed with an air supply port 31 for connecting regulated compressed air from the pressure regulator 5 on one end side thereof and a socket portion 32 connectable with either of plugs for high pressure and for normal pressure respectively having different shapes at other end portion thereof. At inside of a plug receiving opening of the socket portion 32, a first cylindrical member 33 operated by a plug end portion in mounting the normal pressure exclusive plug P1 and a second cylindrical member 34 operated in mounting the high pressure exclusive plug P2 are arranged concentrically and inside of the second cylindrical member 34 is constituted as an air path 35.

Figure 6:
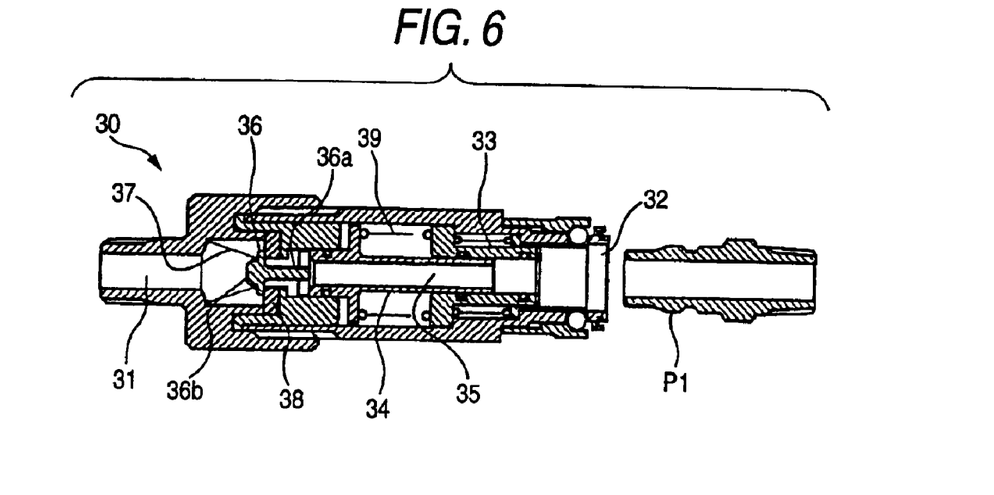
FIG. 6 is a sectional view showing a constitution of a coupler according to a second embodiment of the invention.

A side of the air supply port 31 is provided with an opening/closing valve 36 for opening and closing flow of compressed air from the air supply port 31 to the air path 35 and the opening/closing valve 36 cuts off compressed air from a side of the air supply portion 31 by being seated on a face of a valve seat 38 on a side of the air supply port 31 arranged at a coupler housing and constituted by an elastic member of rubber or the like by a spring 37 urging the opening/closing valve 36 in a closing direction and a press force operated to the opening/closing valve 36 by compressed air supplied from the air supply port 31.

Figure 7:
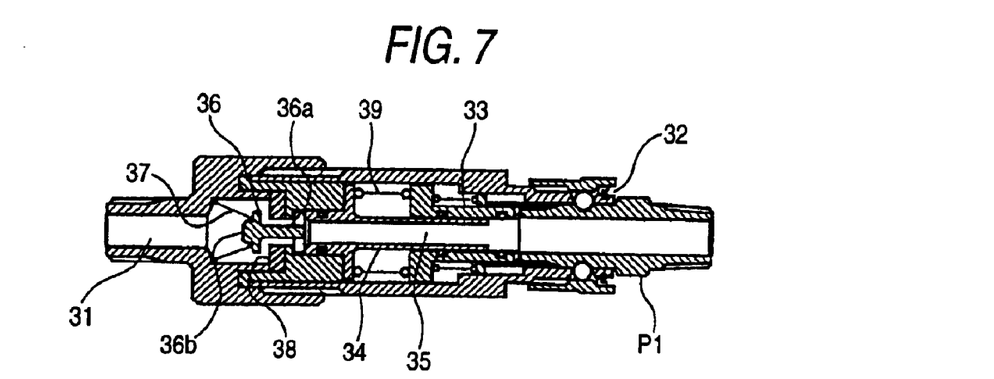
FIG. 7 is a sectional view showing a state in which a normal pressure exclusive plug is mounted to a coupler of the second embodiment and an opening/closing valve is opened.

A face on a downstream side of the opening/closing valve 36 is integrally formed with a valve stem 36a and an end portion of the stem 36a is brought into contact with an end face of the second cylindrical member 34. A compression spring 39 is arranged between the second cylindrical member 34 and the first cylindrical member 33, in a state in which the socket portion 32 is not mounted with the normal pressure exclusive plug P1, the first cylindrical member 33 is not operated and therefore, the compression spring 39 is elongated and the second cylindrical member 34 is not operated with an urge force by the compression spring 39. Therefore, in all of states from a state in which the air supply port 31 is not supplied with compressed air to a state in which the air supply port 31 is supplied with compressed air at high pressure, the opening/closing valve 36 is brought into close contact with the face of the valve seat 38 by operation of the spring 37 or by operation of the spring 37 and compressed air. By operating the first cylindrical member 33 by mounting the normal pressure exclusive plug P1, the compression spring 39 is compressed and the second cylindrical member 34 is elastically urged to the side of the air supply port to thereby urge to press the opening/closing valve 36 in an opening direction. The spring force of the compression spring 39 is set such that when the first cylindrical member 33 is operated by mounting the normal pressure exclusive plug P1, the supply air pressure operated to a pressure receiving face 36b on an upstream side of the opening/closing valve 36 is balanced by an upper limit pressure of operating the normal pressure tool, for example, 8 kg/cm2. Thereby, when the supply air pressure exceeds the above-described set pressure, an operating force of the pressure receiving face 36b of the opening/closing valve 36 exceeds a force of the compression spring 39 to thereby cut off compressed air by pressing to contract the compression spring 39 to move in a closing direction via the second cylindrical member 34.

Figure 8:
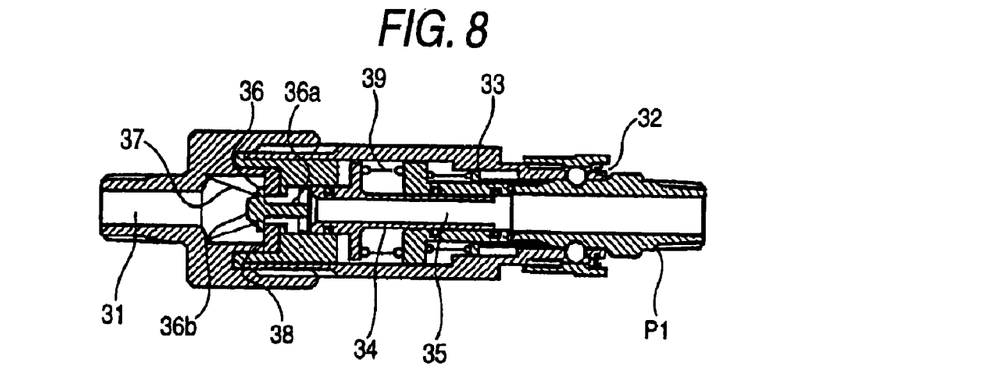
FIG. 8 is a sectional view showing a state of closing the opening/closing valve in a state the same as that of FIG. 7.

When supply pressure is gradually lowered by regulating the pressure regulator 5 from the state in which the regulated pressure of the pressure regulator 5 becomes high and the opening/closing valve 36 is closed as described above, at a time point at which the supply pressure becomes lower than the above-described set pressure, the operating force in the closing direction operated to the pressure receiving face 36b of the opening/closing valve 36 and the press force of the compression spring 39 are reverted, and the opening/closing valve 36 is opened by the spring force of the compression spring 39 to thereby supply compressed air to the side of the plug. Since sealing of the opening/closing valve 36 is constituted by a face sealing structure, there is not sliding resistance of the opening/closing valve 36 in operating to open the opening/closing valve 36, further, the pressure receiving area of the opening/closing valve 36 can be set such that there is not a difference in the pressure receiving area between in opening and in closing and therefore, a difference of the operating air pressure of the opening/closing valve 36 between a closing direction and an opening direction can be reduced.

Figure 9:
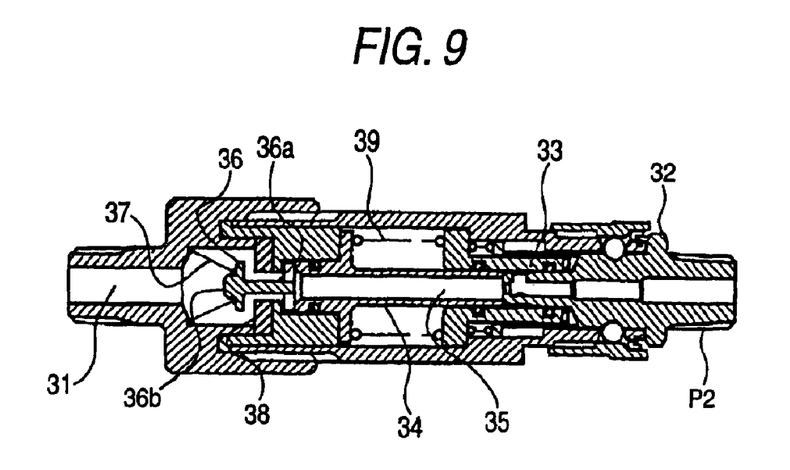
FIG. 9 is a sectional view showing a state of mounting a high pressure exclusive plug to the coupler according to the second embodiment.

When the high pressure exclusive plug P2 is connected to the socket portion 32, the second cylindrical member 34 is operated by a front end of the plug, the opening/closing valve 36 brought into contact with a front end of the second cylindrical member 34 is moved in an opening direction, compressed air is maintained to be able to flow, and compressed air at all of pressures from a normal pressure region to a high pressure region supplied to the air supply port 31 is supplied to the high pressure exclusive plug P2. Further, although compressed air in the normal pressure region is supplied to the high pressure exclusive tool, there is not brought about a state of being accompanied by a danger and therefore, no problem is posed.

(Third Embodiment)

Figure 10:
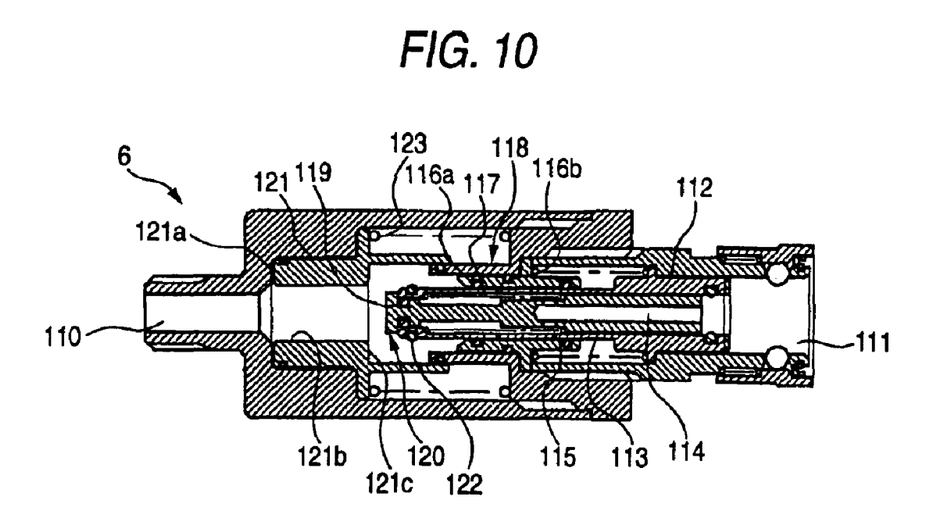
FIG. 10 is a sectional view showing a constitution of a coupler according to a third embodiment of the invention.

An explanation will be given of a third embodiment of the invention in reference to FIG. 10 through FIG. 14 as follows. As shown by FIG. 10, the coupler 6 of the embodiment constituting a compressed air output apparatus is formed with an air supply port 110 connected to the pressure regulator 5 and supplied with compressed air the pressure of which is regulated by the pressure regulator 5 at one end side thereof and formed with a socket portion 111 of a female type for receiving to mount a plug connected to a tool at an end portion thereof on an opposed side. The socket portion 111 is formed to be connectable to either of plugs exclusive for normal pressure and exclusive for high pressure respectively having different shapes. Inside of an opening of the socket portion 111 for receiving the plug is arranged with an end face of an operating rod 112 operated by being brought into contact with a front end of the plug by mounting the normal pressure exclusive plug P1 and an inner side of the operating cylinder 112 is arranged with an operating rod 113 operated by a front end of the plug in mounting the high pressure exclusive plug P2. A base portion side of the operating rod 113 is formed with an air path 114 formed in a hollow shape and communicated with a side of the socket portion 111 and the air path 114 is communicated with inside of a hollow portion of the operating cylinder 112 via a through port 115 formed at the operating rod 113.

The operating cylinder 112 is slidably held at inside of a cylindrical portion formed at a coupler housing, a first cutoff valve 118 is formed by O rings 116a, 116b arranged at an inner peripheral face of the cylindrical portion and a through port 117 formed at an outer peripheral face of the operating cylinder 112, and the first cutoff valve 118 cuts off flow of compressed air supplied to the air supply port 110 to a side of the socket portion 111 in a state in which the normal pressure exclusive plug is not mounted. By mounting the normal pressure exclusive plug P1 to the socket portion 111, the operating cylinder 112 is operated and the through hole 117 traverses the O ring 116a and compressed air on an outer peripheral side of the operating cylinder 112 is introduced into the operating cylinder 110 and is communicated with the side of the socket portion 111 by way of the through port 115 via the air path 114. An outer peripheral face of other end of the operating rod 113 is arranged with an O ring 119 and a second cutoff valve 120 is formed by the O ring 119 and a front end portion of the operating cylinder 112 fitted with the O ring 119. The second cutoff valve 120 prevents compressed air supplied to the air supply port 110 from flowing out to the side of the socket portion 111 in a state in which the high pressure exclusive plug P2 is not mounted to the socket portion 111. When the socket portion 111 is mounted with the high pressure exclusive plug P2 and the operating rod 113 is operated, the O ring 119 is separated from the end portion of the operating cylinder 112 and compressed air supplied to the air supply port 110 is introduced into the operating cylinder 112 and communicated with the side of the socket portion 111 by way of the through port 115 via the air path 114.

Further, a side of the air supply port 110 of the coupler 6 is formed with an opening/closing valve 121 for opening and closing an interval between the air supply port 110 and the above-described first cutoff valve 118. The opening/closing valve 121 is operated by compressed air at high pressure supplied to the air supply port 110 to there by cutoff supply of compressed air at high pressure to the normal pressure exclusive plug P1 by way of the first cutoff valve 118. The opening/closing valve 121 is provided with a pressure receiving face 121a for receiving compressed air supplied to the air supply port 110 and a cylindrical portion 111b fitted with a movable valve body 122 formed at an outer peripheral face of a front end of the operating cylinder 112 and is always urged to the side of the air supply port 110 by an urge spring 123 arranged between the opening/closing valve 121 and the coupler housing. A relationship between a spring force of the urge spring 123 and the pressure receiving face 121a is set such that when a pressure equal to or larger than a set pressure supplied to the air supply port 110 is operated to the pressure receiving face 121a, the opening/closing valve 121 is operated to the side of the socket portion 111 against a combined force of the force of the urge spring 123 and a pressure operated to a position 121c opposed to the pressure receiving face 121a to thereby cut off the interval between the air supply port 110 and the first cutoff valve 118. When the above-described set pressure is set to an upper limit pressure, for example, 8.5 kg/cm2 of the operating pressure region of the normal pressure exclusive tool, the normal pressure exclusive tool can be prevented from being supplied with compressed air at high pressure exceeding the operating pressure region.

Figure 11:
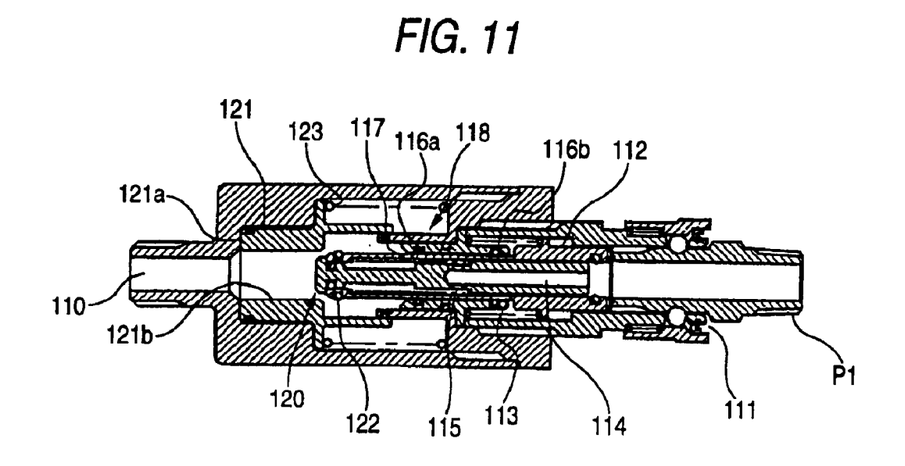
FIG. 11 is a sectional view showing a state of mounting a normal pressure exclusive plug to the coupler according to the third embodiment.

An operating state will be explained in reference to the drawings as follows. In a state in which the air supply port 110 is supplied with compressed air in the operating pressure region of the normal pressure tool, as shown by FIG. 10 and FIG. 11, the pressure operating to the pressure receiving face 121a of the opening and closing valve 121 is small and therefore, the opening/closing valve 121 is operated in a direction of the air supply port 110 by operating the urge spring 113. In a state in which the socket portion 111 is not connected with either of the plugs for normal pressure or high pressure as shown by FIG. 10, the operating cylinder 112 and the operating rod 113 are not operated and therefore, both of the first cutoff valve 118 and the second cutoff valve 120 are cutoff and compressed air at normal pressure supplied to the air supply port 110 is cut off from flowing out to the socket portion 110. As shown by FIG. 11, in a state in which the socket portion 111 is mounted with the normal pressure exclusive plug P1, the operating cylinder 112 is operated by the front end of the plug P1, the through hole 117 constituting the first cutoff valve 118 is moved to the side of the air supply port 110 by traversing the O ring 116a and therefore, compressed air at normal pressure supplied to the air supply port 110 is supplied to the normal pressure exclusive plug P1 via the through port 117 and the air path 114. Although the movable valve body 122 is moved in the direction of the opening/closing valve 121 in accordance with operation of the operating cylinder 112, the movable valve body 122 is not fitted to the cylindrical portion 121b of the opening/closing valve 121 and compressed air at normal pressure is not cut off by the opening/closing valve.

Figure 12:
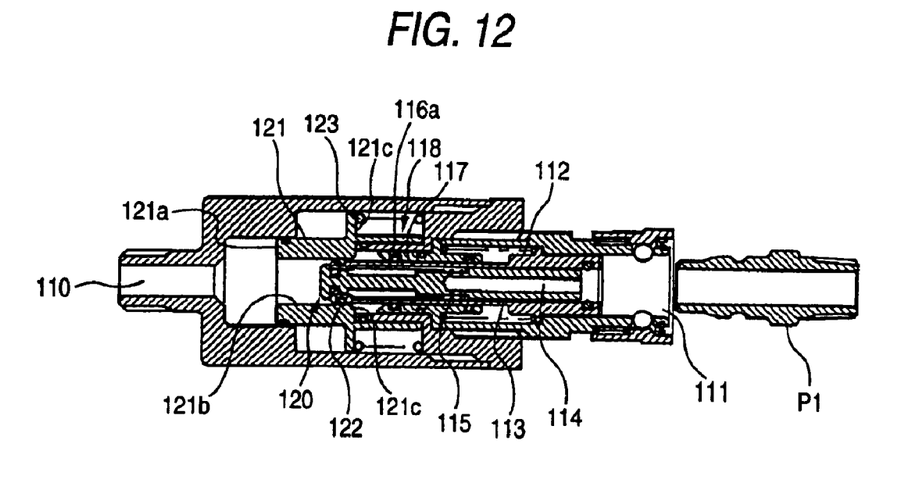
FIG. 12 is a sectional view showing a state of supplying compressed air at high pressure to the coupler of the third embodiment.

As shown by FIG. 12, when the air supply port 110 is supplied with compressed air in the operating pressure region of the high pressure tool exceeding the above-described set pressure, the pressure of compressed air is operated to the pressure receiving face 121a of the opening/closing valve 121 and operates the opening/closing valve 121 to the side of the socket 111 against the urge spring 123. The socket portion 111 is not connected with the normal pressure exclusive plug P1 and therefore, even at a position at which the movable valve body 122 formed at the end portion of the operating cylinder 112 is not operated, an operational stroke of the opening/closing valve 121 is set to be large such that by operating the opening/closing valve 121, the O ring constituting the movable valve body 122 is fitted into the cylindrical portion 121b of the opening/closing valve 121 to cut off compressed air. Therefore, in a state in which compressed air at high pressure is supplied to the air supply port 110, the opening/closing valve 111 cuts off the interval between the first cutoff valve 118 and the air supply port 110 and compressed air at high pressure supplied to the air supply port 110 is cut off from the side of the socket portion 111 by the opening/closing valve 121, the first cutoff valve 118 and the second cutoff valve 120.

Figure 13:
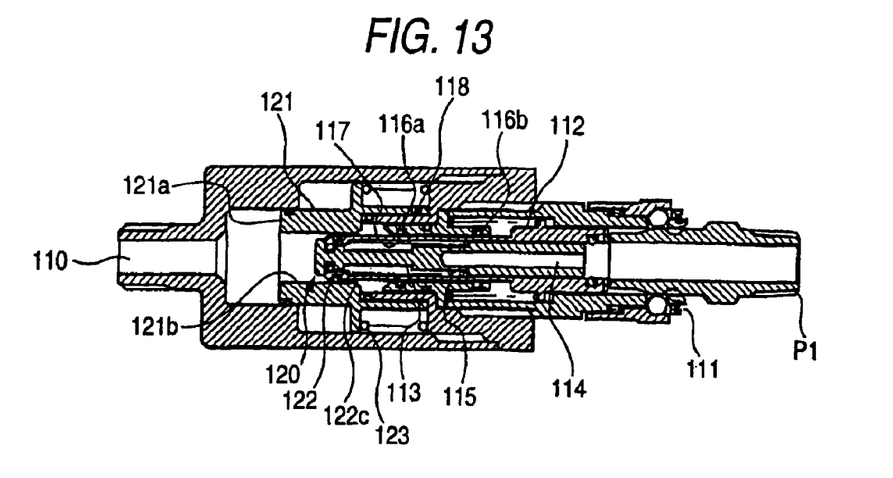
FIG. 13 is a sectional view showing a state of mounting the normal pressure exclusive plug to the coupler supplied with compressed air at high pressure.

As shown by FIG. 13, in a procedure of mounting the normal pressure exclusive plug P1 to the socket portion 111 in a state in which compressed air at high pressure is supplied to the air supply port 110, the operating cylinder 112 is operated by the front end portion of the plug P1 and the through port 117 traverses the O ring 116a to thereby open the first cutoff valve 118 and the normal pressure exclusive plug P1 and the outer peripheral side of the operating cylinder 112 are communicated with each other, however, since the opening/closing valve 121 is brought into a state of cutting off the interval between the air supply port 110 and the first cutoff valve 118 and therefore, even in the procedure of connecting the normal pressure exclusive plug P1, compressed air at high pressure is not supplied to the normal pressure exclusive tool via the normal pressure exclusive plug P1. Even in a procedure of detaching the normal pressure exclusive plug P1 from the socket portion 111, similarly, so far as compressed air at high pressure is supplied to the air supply port 110, the opening/closing valve 121 closes the interval between the air supply port 110 and the cutoff valve 118 and therefore, even when the first cutoff valve 118 is opened, compressed air at high pressure is not introduced to the normal pressure exclusive valve P1.

Figure 14:
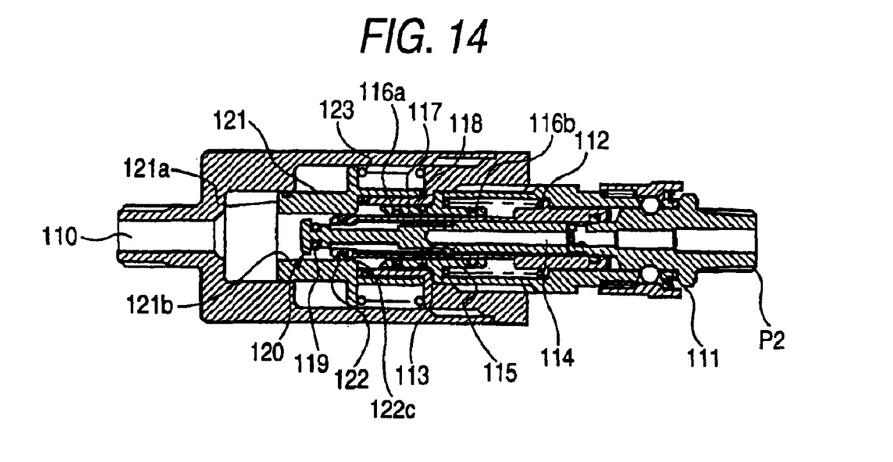
FIG. 14 is a sectional view showing a state of mounting a high pressure exclusive plug to the coupler supplied with compressed air at high pressure.

As shown by FIG. 14, when compressed air in a high pressure region is supplied to the air supply port 110, when the socket portion 111 is mounted with the high pressure exclusive plug P2, the operating rod 113 is operated by the front end of the high pressure exclusive plug P2, the O ring 119 arranged at the front end portion of the operating rod 113 forming the second cutoff valve 120 is detached from the front end of the operating cylinder 112 to open the second cutoff valve 120 and compressed air supplied to the air supply port 110 is supplied to the high pressure exclusive plug via the air path 114. In this way, when the high pressure exclusive plug P2 is mounted thereto, compressed air is supplied via the second cutoff valve 120 without detouring the opening/closing valve 121 and therefore, regardless of the pressure of compressed air supplied to the air supply port 110, compressed air from the normal pressure region to the high pressure region is supplied to the high pressure exclusive tool, however, even when the high pressure exclusive tool is supplied with low pressure of the operating region of the normal pressure tool, no problem is posed since a danger is not brought about.

Although an explanation has been given of the invention in details and in reference to the specific embodiments, it is apparent for the skilled person that the invention can variously be changed or modified without deviating from the sprit and the range of the invention.

The application is based on Japanese Patent Application Number 2001-287583 filed on Sep. 20, 2001 and Japanese Patent Application 2001-287584 filed on Sep. 20, 2001, contents thereof are incorporated here by reference.

INDUSTRIAL APPLICABILITY

As described above, according to the first aspect of the invention, there is included the pressure reducing valve for reducing the pressure to the upper limit pressure of the pressure of operating the normal pressure tool and therefore, when the normal pressure exclusive plug P1 is connected thereto, the supply pressure higher than the upper limit pressure is automatically reduced to the upper limit pressure to supply to the normal pressure exclusive plug P1 and therefore, high pressure exceeding the upper limit pressure is not supplied to the tool. Further, in connecting the high pressure exclusive plug P2, the opening/closing valve 18 is forcibly moved to the opening position to maintain by connecting the plug and therefore, in using the high pressure tool, the function of the pressure reducing valve is not operated and compressed air at an arbitrary pressure regulated by the pressure regulator 5 can be supplied to the high pressure tool. Further, the normal pressure tool can be used at the arbitrary pressure in the normal pressure region by regulating the pressure regulator 5 and even when the regulated pressure value at the pressure regulator 5 exceeds the normal pressure region, compressed air at the upper limit pressure of the operating pressure region of the normal pressure tool is continued to be supplied without cutting off supplied air and therefore, the operation is not stopped.

Further, according to the second aspect of the invention, sealing of the opening/closing valve 36 is constituted by the face sealing structure and therefore, there is not sliding resistance in operating to open and close the opening/closing valve 36, further, the pressure receiving area of the opening/closing valve 36 can be set not to differ between in opening and closing the opening/closing valve 36 and therefore, the difference between operating air pressure between the closing direction and the opening direction of the opening/closing valve 36 can be reduced. Therefore, by operating to regulate again the pressure supplied by the pressure regulator 5, supply pressure in the normal pressure region can further swiftly be supplied and operability of the normal pressure tool can be promoted.

Further, according to the third aspect of the invention, the first cutoff valve 118 operated by mounting the normal pressure exclusive plug P1 and the second cutoff valve 120 operated by operating the high pressure exclusive plug P2 are formed independently from each other, the opening/closing valve 121 operated by compressed air exceeding the set pressure supplied to the air supply port 110 is arranged between the air supply port 110 and the first cutoff valve 118, the opening/closing valve 121 is cut off by exceeding the set pressure by compressed air supplied to the air supply port and therefore, so far as compressed air exceeding the set pressure is supplied to the air supply port 110, high pressure is not supplied to the first cutoff valve 118 opened by the normal pressure exclusive plug P1 and therefore, even in the midst of connecting or in the midst of detaching the normal pressure exclusive plug P1, compressed air at high pressure can be prevented from being supplied to the side of the plug and the normal pressure exclusive tool can be prevented from being destructed by compressed air at high pressure. Further, since the second cutoff valve 120 operated by the high pressure exclusive plug P2 is installed on the downstream side of the air supply port 110 without interposing the opening/closing valve 121 and therefore, regardless of operation of the opening/closing valve 121, compressed air supplied to the air supply port 110 can always be supplied to the high pressure exclusive tool by way of the high pressure exclusive plug P2.

What is claimed is:

1. A coupler, in a compressor including a pressure regulator for regulating compressed air at a high pressure stored to an air tank to an arbitrary pressure to supply, for connecting the compressed air regulated by the pressure regulator to respective exclusive tools by way of a high pressure exclusive plug and a normal pressure exclusive plug, comprising:

a socket portion formed at one end of the coupler and capable of mounting either of the high pressure exclusive plug and the normal pressure exclusive plug;

an opening/closing valve for opening and closing a flow path of the compressed air supplied to an upstream side of the socket portion via the pressure regulator;

an operating member, operatable according to an air pressure value of the compressed air supplied from the upstream side of the socket portion; and a rod operated by mounting the high pressure exclusive plug to the socket portion, for contacting with and pushing the opening/closing valve, wherein the opening/closing valve is opened and closed according to the operation of the operating member, when the normal pressure exclusive plug is mounted to the socket portion, and the opening/closing valve is maintained at an opening position pushed by the rod, when the high pressure exclusive plug is mounted to the socket portion.

2. A coupler, in a compressor including a pressure regulator for regulating compressed air at a high pressure stored to an air tank to an arbitrary pressure to supply, for connecting the compressed air regulated by the pressure regulator to respective exclusive tools by way of a high pressure exclusive plug and a normal pressure exclusive plug, comprising:

a socket portion formed at one end of the coupler and capable of mounting either of the high pressure exclusive plug and the normal pressure exclusive plug;

an opening/closing valve for opening and closing a flow path of the compressed air supplied to an upstream side of the socket portion via the pressure regulator;

a first cylindrical member operated by mounting the normal pressure exclusive plug to the socket portion; and a second cylindrical member, for contacting with and pushing the opening/closing valve, operated by mounting the high pressure exclusive plug to the socket portion, and operated according to an air pressure value of the compressed air supplied from the upstream side of the socket portion when the normal pressure exclusive plug is mounted to the socket portion, wherein the opening/closing valve is opened and closed according to the operating of the second cylindrical member, when the normal pressure exclusive plug is mounted to the socket portion, and the opening/closing valve is maintained at an opening position pushed by the second cylindrical member, when the high pressure exclusive plug is mounted to the socket portion.

3. A coupler, in a compressor including a pressure regulator for regulating compressed air at a high pressure stored to an air tank to an arbitrary pressure to supply, for connecting the compressed air regulated by the pressure regulator to respective exclusive tools by way of a high pressure exclusive plug and a normal pressure exclusive plug, comprising:

a socket portion formed at one end of the coupler and capable of mounting either of the high pressure exclusive plug and the normal pressure exclusive plug;

a first cutoff valve operated by mounting the normal pressure exclusive plug;

a second cutoff valve operated by mounting the high pressure exclusive plug; and an opening/closing valve operated according to an air pressure value of the compressed air supplied from the upstream side of the socket portion;

wherein the opening/closing valve closes an interval between an air supply port formed at the other end of the coupler and the first cutoff valve, when the pressure of the compressed air supplied to the air supply port exceeds a predetermined pressure, and an air path between the second cutoff valve and the air supply port is formed without interposing the opening/closing valve.

* * * * *